United States Patent Office 2,897,173
Patented July 28, 1959

2,897,173

PROCESS FOR COMPOUNDING A CONJUGATED DIOLEFIN POLYMER WITH A SILICEOUS FILLER AND AN ORGANOHALOSILANE

Fitzhugh W. Boggs, Upper Montclair, N.J., assignor to United States Rubber Company, New York, N.Y., a corporation of New Jersey No Drawing. Application December 12, 1951
Serial No. 261,361

2 Claims. (Cl. 260—41.5)

This invention relates to the compounding of rubber and more particularly to a method whereby the objectionable great stiffening action of fine particle size precipitated hydrated silica and precipitated hydrated calcium silicate fillers when compounded in sulfur-vulcanizable elastomers is overcome.

The present invention is based upon my discovery that treatment of fine particle size precipitated hydrated silica and precipitated hydrated calcium silicate fillers with saturated and quasi-saturated organohalosilanes effects a great reduction in the stiffening action of such fillers when they are incorporated in sulfur-vulcanizable elastomers. It is well known that when such fine particle size fillers are compounded in vulcanizable elastomers they cause the vulcanized products to be excessively stiff. The present invention overcomes this serious disadvantage. The extent to which the flexibility of the vulcanizate is improved by means of the present invention is indicated by measurements of torsional hysteresis and of hardness. Both the torsional hysteresis and the hardness (as determined by durometer measurement) are lowered markedly as a result of the treatment of the filler with the organohalosilane in accordance with my invention.

The organohalosilanes used in my invention comprise the saturated aliphatic and cycloaliphatic halosilanes as well as the quasi-saturated, that is, the aromatic, halosilanes. The organohalosilanes which I can use have the formula $R_nSiX_{4-n}$ where R is a saturated aliphatic hydrocarbon (alkyl) radical, typically having from 1 to 20 carbon atoms, or a saturated cycloaliphatic hydrocarbon (cycloalkyl) radical, typically cyclohexyl or alkyl-substituted cyclohexyl, e.g. methylcyclohexyl, or an aromatic hydrocarbon (aryl) radical, typically phenyl, X is halogen, preferably chlorine although it can be bromine or iodine, and n is an integer of from 1 to 3, but preferably is either 1 or 2 and more preferably is 1.

Examples of organohalosilanes which have been used in accordance with my invention are:

Diethyldichlorosilane
Amyltrichlorosilane
Nonyltrichlorosilane
Dodecyltrichlorosilane
Hexadecyltrichlorosilane
Cyclohexyltrichlorosilane
Diphenyldichlorosilane
Trimethylmonochlorosilane As the filler used in preparing elastomeric stocks in accordance with my invention, I can use any precipitated hydrated silica or precipitated hydrated calcium silicate of fine particle size. Preferably the filler used has an average particle size less than 0.1 micron. A number of such hydrated silica or hydrated calcium silicate fillers are commercially available to the rubber compounder.

The fillers operative in my invention absorb water under normal atmospheric conditions and are generally obtained with an adsorbed film of water. In general, fillers with water of hydration amounting to not less than 0.02 gram per 100 square meters of surface area are preferred in my invention.

Those fillers which have been prepared or dried at high temperatures (500° F. or higher) are not appreciably changed in their reinforcing properties by the treatment of my invention. An example of such a filler is one made in accordance with U.S. Patent 2,535,036.

I believe the important feature of the fillers used in my invention is that they contain hydroxyl groups which are chemically bound to the matrix of the filler. The OH groups are actually bonded to the silicon atoms in the filler. For a pertinent discussion see Pauling, "The Nature of the Chemical Bond," Cornell University Press, 1940.

I have obtained good results with a finely divided precipitated hydrated silica known as "Hi-Sil" having an average particle diameter of about 200 Angstrom units (=0.02 micron), a surface area of 150 square meters per gram and a degree of hydration equal to 0.073 gram of moisture per 100 square meters of surface area. I have also obtained good results with a hydrated silica of the same general type and obtained by precipitation from an aqueous colloidal dispersion of silica known commercially as "Ludox," the silica derived therefrom having a particle size of about 250 Angstrom units (0.025 micron), a surface area of 125 square meters per gram and a degree of hydration of 0.046 gram of water per 100 square meters of surface area.

I have also obtained very satisfactory results with a filler known as "Silene EF" which is a precipitated hydrated calcium silicate having a particle size of about 300 Angstrom units (0.03 micron), and containing 13–19 percent of water by weight.

The present invention is particularly applicable to fillers of the above type which are finer than 0.1 micron. The invention is not applicable with clays of the type commonly used as reinforcing fillers in rubber. For example, the organohalosilane treatment disclosed herein is ineffective with the rubber filler known commercially as "Suprex" clay which is a kaolin having a much larger particle size than 0.1 micron, typically averaging approximately 5,000 Angstrom units or 0.5 micron. It was surprising to find that this filler would not respond to the treatment of the invetnion even though it has a degree of hydration considerably greater than 0.02 gram of moisture per hundred square meters of surface area.

The amount of organohalosilane used for treating the filler in accordance with my invention can vary widely depending upon numerous factors. Generally speaking, I employ an amount thereof equal to from 5 to 15% of the weight of the filler.

The filler can be treated with the organohalosilane in any manner which results in reaction between the filler and the organohalosilane with evolution of hydrogen halide corresponding to the halogen in the organohalosilane. This reaction must occur prior to vulcanization.

I may effect filler treatment by pre-treating the filler with the organohalosilane before incorporating the filler with the rubber. In effecting pre-treatment of the filler with the organohalosilane, I have used both a vapor phase method and a solution method. The solution method is convenient and effective and is often preferable. In the solution method, I slurry the filler to be treated in an inert solvent for the silane, especially a low-boiling hydrocarbon solvent, add the organohalosilane to the resulting slurry, heat the mixture to the refluxing point and continue to heat under refluxing conditions until substantially all of the silane has reacted with the filler. I prefer to employ a paraffinic hydrocarbon solvent such as petroleum ether for this purpose. The amount of solvent required to form a smooth slurry will vary with the particular filler being treated. Approximately four to seven times as much solvent by weight as filler is usually used. The paraffin hydrocarbon solvents are preferred because they are inert with respect to the organohalosilane and the hydrogen halide and at the same time are good solvents for the organohalosilane so that a high degree of effectiveness of the treatment is attained. In addition, the paraffin solvents are readily available at low cost.

A refluxing period of three hours is sufficient for most reactions of filler with organohalosilane to go to substantial completion.

After the reaction of the filler with the silane is substantially complete, the filler is separated from the liquid as by filtration or centrifuging after which residual solvent is evaporated by moderate heating. The treated filler is then ready for use in the rubber.

In the vapor phase method of pre-treating the filler, I simply place the filler in a tube and pass air saturated with the organohalosilane through the tube, making suitable provision to trap out unreacted silane and hydrogen halide from the effluent gas.

Instead of pre-treating the filler with the organohalosilane, I can effect filler treatment "in situ," i.e., incorporate the organohalosilane directly with the rubber and the filler, for example on the conventional rubber mill or in the conventional internal mixer, e.g., a Banbury mixer, used for preparing the rubber stock. The improvement in physical properties of the resulting vulcanizate is of the same character and order of magnitude as when the filler is pre-treated with the silane in the manner described above. Those organohalosilanes which contain six or more carbon atoms per molecule exhibit a sufficiently low volatility to enable their introduction directly with the rubber-and-filler mixture without excessive losses by volatilization such as would occur with lower-boiling organohalosilanes.

In carrying out the "in situ" treatment of the filler with the organohalosilane, I may subject the mixture of rubber, filler and silane to a hot milling step at an elevated temperature of the order of from 250° to 400° F. This hot milling step is carried out in order to accelerate the reaction between the silane and the filler. Thereafter, zinc oxide and the usual vulcanizing agents are added to the resulting mixture at a relatively low temperature, after which the mixture is vulcanized in the conventional manner. Addition of the zinc oxide and vulcanizing agents is preferably deferred in the manner described in order to prevent prevulcanization or "scorching" of the mixture. I prefer to delay the introduction of zinc oxide especially since otherwise the zinc oxide reacts with the silane, correspondingly reducing the extent of improvement of the filler.

Because hydrogen halide, usually hydrogen chloride, is a product of the reaction of the silane with the filler, when the "in situ" addition of the silane as just described is practiced, it is important to provide good ventilation during the mixing operations. I have also found it desirable to carry out the admixture of the rubber, filler and silane in the presence of an alkaline earth metal carbonate, e.g., calcium carbonate or barium carbonate, in amount sufficient to neutralize any free hydrogen halide.

My invention is particularly applicable with certain synthetic rubbers. One of these is Butyl rubber which, as is well known, is a rubbery copolymer of a major proportion of isobutylene, and a minor proportion of a conjugated diolefin hydrocarbon, especially butadiene or isoprene. The proportions of monomers usually range from 70 to 99.5 percent of the monoolefin and from 30 to 0.5 parts of the diolefin. Butyl rubber is characterized by having an unsaturation below an iodine number of 50, a molecular weight above 20,000, and curability with sulfur to yield an elastic product.

The other type of synthetic rubber to which the invention is particularly applicable is of the type known as conjugated diene polymer synthetic rubber. This may be a homopolymer of an aliphatic conjugated diolefin hydrocarbon such as butadiene or isoprene or it may be a rubbery copolymer of an aliphatic conjugated diolefin hydrocarbon with one or more other copolymerizable compounds, for example, one or more compounds which contain a single $CH_2=C<$ group where at least one of the disconnected valences is attached to an electro-negative group, i.e., a group which substantially increases the electrical dissymmetry or polar character of the molecule. The monomeric mixture may contain up to 70% of the last-named compound. Examples of such copolymerizable compounds are aryl olefins, such as styrene and vinyl naphthalene; the alpha-methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride; vinyl pyridine.

Conjugated diene polymer synthetic rubbers to which my invention is particularly applicable are rubbery copolymers of butadiene and styrene (so-called GR–S) and rubbery copolymers of butadiene and acrylonitrile (so-called GR–A).

My invention is also applicable to natural rubber by which I mean rubber obtained from *Hevea brasiliensis*.

The following examples will illustrate the invention more fully. The data on physical properties reported in these examples were obtained at room temperature unless otherwise noted. Stress-strain properties were measured by conventional ASTM methods. The stress at 300% elongation (S–300) has been taken as a measure of modulus. Hysteresis was determined at 280° F. on a torsional hysterometer (see M. Mooney and R. H. Gerke, India Rubber World, 103, 29 (1941)). Durometer hardness was measured as Shore A durometer after five seconds.

EXAMPLE I

"Hi-Sil" silica and "Silene EF" calcium silicate were treated with 10% by weight of various organochlorosilanes by the solution method described above. The treated fillers were then incorporated in a Butyl rubber stock having the formulation given below. Identical stocks containing untreated filler were prepared for comparative purposes. The rubber formulation was as follows:

| | Parts by weight |
|---|---|
| Butyl rubber | 100. |
| Zinc oxide | 5. |
| Stearic acid | 1. |
| Sulfur | 1.5. |
| Accelerators | 2.5. |
| Filler | 54 parts in the case of "Hi-Sil," 58 parts in the case of "Silene EF" (representing equal volumes of filler). |

The stocks were press-cured 60 minutes at 307° F. The physical properties of the resulting stocks were as follows:

Table I

| Filler | Properties of Butyl Stock Containing Filler | | | | |
|---|---|---|---|---|---|
| | Durometer | Tors. Hyst at 280° F. | Tensile | Elong. | S-300 |
| "Hi-Sil" silica treated with: | | | | | |
| Diethyldichlorosilane | 51 | .123 | 1,680 | 650 | 400 |
| Hexadecyltrichlorosilane | 49 | .098 | 1,840 | 750 | 325 |
| Untreated | 67 | .332 | 1,780 | 780 | 360 |
| Amyltrichlorosilane | 47 | .091 | 1,510 | 630 | 355 |
| Nonyltrichlorosilane | 47 | .078 | 1,660 | 660 | 290 |
| Dodecyltrichlorosilane | 47 | .081 | 1,640 | 670 | 310 |
| Untreated | 75 | .349 | 1,520 | 700 | 425 |
| Cyclohexyltrichlorosilane | 47 | .139 | 1,550 | 650 | 345 |
| Untreated | 75 | .349 | 1,520 | 700 | 425 |
| Diphenyldichlorosilane | 54 | .260 | 1,770 | 680 | 370 |
| Untreated | 67 | .332 | 1,780 | 780 | 360 |
| "Silene EF" calcium silicate treated with: | | | | | |
| Diethyldichlorosilane | 47 | .097 | 1,510 | 650 | 335 |
| Hexadecyltrichlorosilane | 48 | .124 | 1,260 | 580 | 400 |
| Untreated | 60 | .214 | 1,270 | 640 | 485 |

EXAMPLE II

The procedure of Example I was duplicated using hexadecyltrichlorosilane as the treating agent but using a hydrated silica obtained by precipitation from an aqueous colloidal dispersion of silica known as "Ludox," this silica having a particle size of about 250 Angstrom units, a surface area of 125 square meters per gram and a degree of hydration of 5.6% corresponding to 0.046 gram of water per 100 square meters of surface area. The amount of filler used was 54 parts by weight, this representing a volume loading substantially the same as that used in Example I. The physical properties of the stock made with the pre-treated silica and a stock containing the untreated filler were as follows:

Table II

| "Ludox" silica pretreated with— | Properties of Butyl stock containing filler | | | | |
|---|---|---|---|---|---|
| | Durometer | Tors. Hyst. at 280° F. | Tensile | Elong. | S-300 |
| Hexadecyltrichlorosilane | 50 | .065 | 1,400 | 580 | 300 |
| Untreated | 70 | .284 | 1,350 | 580 | 440 |

From Examples I and II it will be seen that substantial reductions in torsional hysteresis and hardness are obtained with all of the alkyl halosilanes which were used. A tendency toward greater effectiveness is indicated for the alkyl halosilanes having the longer alkyl groups. The cycloaliphatictrichlorosilane, cyclohexyltrichlorosilane, is also shown to be effective. In contrast, the aromatic organohalosilane, diphenyldichlorosilane, is here less effective than the aliphatic and cycloaliphatichalosilanes.

EXAMPLE III

"Hi-Sil" silica was treated with various organochlorosilanes by the solution method, using 10% by weight of the silane based on the filler. The treated filler was then incorporated in "GR-S" using the following formulation:

| | Parts by weight |
|---|---|
| GR-S | 100 |
| Coumarone resin | 10 |
| "Hi-Sil" silica | 54 |
| Zinc oxide | 5 |
| Diethylene glycol | 3 |
| Accelerators | 2 |
| Stearic acid | 2 |
| Sulfur | 3 |

These stocks together with control stocks made in the same manner but using untreated "Hi-Sil" silica, were cured 40 minutes at 292° F. The resulting stocks had the following physical properties:

Table III

| "Hi-Sil" silica pretreated with— | Properties of GR-S stock containing filler | | | | |
|---|---|---|---|---|---|
| | Durometer | Tors. Hyst. at 280° F. | Tensile | Elong. | S-300 |
| Trimethylmonochlorosilane | 61 | .134 | 2,840 | 680 | 550 |
| Diethyldichlorosilane | 61 | .097 | 2,770 | 660 | 565 |
| Hexadecyltrichlorosilane | 57 | .061 | 2,490 | 650 | 380 |
| Untreated | 68 | .238 | 2,670 | 630 | 610 |
| Diethyldichlorosilane | 61 | .115 | 2,590 | 610 | 560 |
| Amyltrichlorosilane | 60 | .109 | 2,580 | 600 | 600 |
| Nonyltrichlorosilane | 59 | .091 | 2,400 | 610 | 510 |
| Dodecyltrichlorosilane | 59 | .086 | 2,490 | 620 | 490 |
| Untreated | 70 | .243 | 2,490 | 540 | 760·525 |
| Diphenyldichlorosilane | 61 | .118 | 2,650 | 680 | 610 |
| Untreated | 68 | .238 | 2,670 | 630 | 610 |

It will be seen that the improvements effected parallel those for Butyl vulcanizates closely except that the aromatic silane is more effective in the case of GR-S than in the case of Butyl rubber.

EXAMPLE IV

This example is given to show that the beneficial effects of the saturated organohalosilane treatment are obtained only with the fine particle size fillers and are not obtained to any worthwhile extent in the case of clays of the type commonly used as rubber fillers.

In this example separate portions of "Hi-Sil" silica and "Suprex" clay were pre-treated with diethyldichlorosilane or with hexadecyltrichlorosilane, and each was incorporated in both a GR-S and a Butyl stock. The solution method of pre-treatment, using 10% by weight of the silane based on the filler, was employed.

The results were as shown in the following Table IV:

Table IV

BUTYL COMPOUNDS

| Feature | Durometer | Tors. Hyst. at 280° F. | Tensile | Elong. | S-300 |
|---|---|---|---|---|---|
| "Hi-Sil" Silica: | | | | | |
| Diethyldichlorosilane-treated | 51 | .123 | 1,680 | 650 | 400 |
| Untreated | 67 | .332 | 1,780 | 780 | 360 |
| Hexadecyltrichlorosilane-treated | 49 | .098 | 1,840 | 750 | 325 |
| Untreated | 67 | .332 | 1,780 | 780 | 360 |
| "Suprex" Clay: | | | | | |
| Diethyldichlorosilane-treated | 51 | .166 | 895 | 540 | 450 |
| Untreated | 51 | .149 | 920 | 500 | 500 |
| Hexadecyltrichlorosilane-treated | 52 | .122 | 1,090 | 530 | 470 |
| Untreated | 52 | .148 | 1,050 | 560 | 480 |

GR-S COMPOUNDS

| | | | | | |
|---|---|---|---|---|---|
| "Hi-Sil" Silica: | | | | | |
| Diethyldichlorosilane-treated | 61 | .097 | 2,770 | 660 | 565 |
| Untreated | 68 | .238 | 2,670 | 630 | 610 |
| Hexadecyltrichlorosilane-treated | 57 | .061 | 2,490 | 650 | 380 |
| Untreated | 68 | .238 | 2,670 | 630 | 610 |
| "Suprex" Clay: | | | | | |
| Diethyldichlorosilane-treated | 57 | .159 | 1,630 | 570 | 570 |
| Untreated | 58 | .150 | 1,410 | 440 | 650 |
| Hexadecyltrichlorosilane-treated | 58 | .125 | 1,810 | 540 | 600 |
| Untreated | 58 | .159 | 1,800 | 540 | 550 |

Compounding recipes used in Example IV:

GR-S

| | |
|---|---|
| GR-S | 100. |
| Cumar MH (coumarone resin) | 10. |
| Zinc oxide | 5. |
| Diethylene glycol | 3. |
| Accelerators | 2. |
| Stearic acid | 2. |
| Sulfur | 3. |
| Filler | 54 of "Hi-Sil," or 72 of "Suprex" clay. |

Cure: 45' at 292° F.

Butyl

| | |
|---|---|
| Butyl rubber | 100. |
| Zinc oxide | 5. |
| Stearic acid | 1. |
| Accelerator | 2.5. |
| Sulfur | 1.5. |
| Filler | 54 of "Hi-Sil," or 72 of "Suprex" clay. |

Cure: 60' at 307° F.

It will be seen that the saturated organochlorosilanes are highly effective for the pre-treatment of "Hi-Sil" silica but have little effect when used for pre-treating a kaolin like "Suprex" clay.

EXAMPLE V

"Hi-Sil" silica was pre-treated by the solution method with 10% of its weight of diethyldichlorosilane or of hexadecyltrichlorosilane, and each treated silica was used in a butadiene-acrylonitrile rubber stock. The formulation employed was as follows:

| | Parts by weight |
|---|---|
| Butadiene-acrylonitrile rubbery copolymer ("Paracril B") | 100 |
| Coumarone resin | 15 |
| Zinc oxide | 5 |
| Stearic acid | 2 |
| Accelerator | 1.5 |
| Sulfur | 2 |
| "Hi-Sil" silica | 54 |

The stocks containing the pre-treated filler and control stocks containing untreated filler were cured for 40 minutes at 320° F. The physical properties of the resulting vulcanizates were as follows:

Table V

| "Hi-Sil" silica pretreated with— | Properties of "Paracril B" stock containing filler | | | | |
|---|---|---|---|---|---|
| | Durometer | Tors. Hyst. at 280° F. | Tensile | Elong. | S-300 |
| Diethyldichlorosilane | 60 | .101 | 1,810 | 540 | 730 |
| Untreated (control) | 65 | .221 | 1,950 | 650 | 785 |
| Hexadecyltrichlorosilane | 53 | .116 | 1,770 | 700 | 340 |
| Untreated (control) | 63 | .215 | 2,340 | 710 | 670 |

It will be seen from Table V that pre-treatment of the filler in accordance with my invention and use of the resulting filler in butadiene-acrylonitrile rubbery copolymer stocks effects improvements similar to those obtained in Butyl and GR-S stocks.

EXAMPLE VI

This example illustrates the "in situ" treatment of "Hi-Sil" silica with nonyltrichlorosilane and hexadecyltrichlorosilane. The compounding procedure and the data on the cured stocks are given in the following Table VI.

Table VI

| Organohalosilane added In Situ | Properties of Butyl stock containing filler | | | | | |
|---|---|---|---|---|---|---|
| | Parts Silane | Durometer | Tensile (R.T.) | Percent Elong. | S-300 Modulus | 280° F. Tors. Hyst. |
| Mixing Procedure I: | | | | | | |
| None | 0 | 64 | 1,500 | 730 | 375 | .37 |
| Hexadecyltrichlorosilane | 1.25 | 52 | 1,500 | 760 | 320 | .33 |
| Do | 2.5 | 52 | 1,700 | 720 | 320 | .18 |
| Do | 5.0 | 43 | 1,650 | 750 | 250 | .09 |
| Mixing Procedure II: | | | | | | |
| None | 0 | 65 | 1,530 | 720 | 400 | .43 |
| Nonyltrichlorosilane | 4 | 51 | 1,430 | 600 | 450 | .15 |
| Hexadecyltrichlorosilane | 4 | 46 | 1,540 | 680 | 375 | .12 |

MIXING PROCEDURE I.—COMPOUNDING INGREDIENTS AND MILLING PROCEDURE (1) Following ingredients milled on a cold mill:

| | |
|---|---|
| Butyl rubber | 100 |
| "Hi-Sil" silica | 54 |
| Zinc oxide | 5.0 |
| Red oxide | 5.0 |
| Calcium carbonate | 5.0 |
| Stearic acid | 1.0 |
| Accelerators | 2.5 |
| Sulfur | 1.25 |
| Silane (Amt. in Table VI). | |

(2) Cured 40' at 307° F.

MIXING PROCEDURE II.—COMPOUNDING INGREDIENTS AND MILLING PROCEDURE

A

| | |
|---|---|
| Butyl rubber | 90 |
| "Hi-Sil" silica | 54 |
| Stearic acid | 1 |
| Calcium carbonate | 5 |

B

| | |
|---|---|
| Butyl rubber | 10 |
| Zinc oxide | 5 |
| Accelerators | 2.5 |

(1) "A" milled together on cold mill.
(2) Silane milled into "A" and the mixture milled for 10' at 300° F.
(3) "B" added on a cold mill along with 1.5 pts. sulfur.
(4) Resultant compound molded and cured for 80' at 307° F.

It will be noted that in this example two different compounding procedures were used. The experiments in which the hot milling was carried out more closely approximate factory procedures.

EXAMPLE VII

The "in situ" treatment of "Hi-Sil" silica with hexadecyltrichlorosilane was applied to GR-S stocks. The compounding procedure and the data on the cured stocks are given in the following Table VII.

Table VII

| Organohalosilane added In Situ | Properties of GR-S stock containing filler | | | | | |
|---|---|---|---|---|---|---|
| | Parts Silane | Durometer | R.T. Tensile | Percent Elong. | S-300 Modulus | 280° F. Tors. Hyst. |
| Control | 0 | 70 | 2,310 | 590 | 645 | .22 |
| Hexadecyltrichlorosilane | 1 | 62 | 2,430 | 680 | 510 | .15 |
| Do | 2 | 60 | 2,330 | 680 | 450 | .13 |
| Do | 4 | 55 | 1,960 | 690 | 465 | .10 |

COMPOUNDING INGREDIENTS AND MILLING PROCEDURE (1) Following ingredients milled together on a cold mill:

| | |
|---|---:|
| GR-S | 100 |
| "Hi-Sil" silica | 60 |
| Zinc oxide | 5.0 |
| Coumarone resin | 10.0 |
| Diethylene glycol | 13.0 |
| Calcium carbonate | 5.0 |
| Stearic acid | 2.0 |
| Accelerators | 1.2 |
| Sulfur | 3.0 |

(2) Resultant compound molded and cured for 45' at 45# steam.

Table VII shows that the "in situ" treatment is as effective in GR-S stocks as in the Butyl stocks of Example VI.

From the foregoing description, many advantages of the present invention will be apparent to those skilled in the art. The principal advantage is that the invention provides a simple method of substantially reducing the stiffening action of the fine particle size fillers of the type represented by "Hi-Sil" and "Silene EF." The invention brings about a marked reduction in hysteresis and hardness of the vulcanized stocks. The invention is easily practiced and does not require the use of special equipment.

The invention makes it possible to use synthetic rubber stocks such as GR-S stocks in many applications where flexible, low-modulus natural rubber stocks have been used in the past and for which GR-S has not been considered useable. Footwear and specialty applications, such as bathing caps, are examples. Heretofore, it has been difficult to provide a GR-S stock having satisfactory tensile strength and at the same time a low modulus and good flexibility. The dilemma has been that fillers such as carbon black which are reinforcing with respect to tensile strength are also reinforcing with respect to modulus. The present invention resolves this dilemma by enabling the use of fine particle size silica or calcium silicate fillers which are so treated that good tensile, low modulus and good flexibility are simultaneously achieved. Many other advantages of the present invention will be apparent to those skilled in the art.

Having thus described my invention, what I claim and desire to protect by Letters Patent is:

1. The process which comprises commingling a sulfur-vulcanizable elastomer selected from the group consisting of rubbery copolymers of a major proportion of isobutylene and a minor proportion of a conjugated diolefin hydrocarbon and conjugated diolefin polymer synthetic rubbers, a filler selected from the group consisting of precipitated hydrated silica and precipitated hydrated calcium silicate, said filler having an average particle size less than 0.1 micron, and an organohalosilane selected from the group consisting of saturated aliphatic and cycloaliphatic organohalosilanes and aromatic organohalosilanes in which the halogen is selected from the group consisting of chlorine, bromine and iodine, and effecting chemical reaction between said filler and said organohalosilane with the liberation of hydrogen halide corresponding to said halogen, subsequently incorporating vulcanizing ingredients with the resulting mixture, and vulcanizing the resulting mixture.

2. The process which comprises commingling a sulfur-vulcanizable elastomer selected from the group consisting of rubbery copolymers of a major proportion of isobutylene and a minor proportion of a conjugated diolefin hydrocarbon and conjugated diolefin polymer synthetic rubbers, a filler selected from the group consisting of precipitated hydrated silica and precipitated hydrated calcium silicate, said filler having an average particle size less than 0.1 micron, and an organohalosilane selected from the group consisting of saturated aliphatic and cycloaliphatic organohalosilanes and aromatic organohalosilanes in which the halogen is selected from the group consisting of chlorine, bromine and iodine, and effecting chemical reaction between said filler and said organohalosilane with the liberation of hydrogen halide corresponding to said halogen, an alkaline earth metal carbonate being present in the mixture during said chemical reaction to neutralize the liberated hydrogen halide, subsequently incorporating vulcanizing ingredients with the resulting mixture, and vulcanizing the resulting mixture.

References Cited in the file of this patent

UNITED STATES PATENTS

| | | |
|---|---|---|
| 1,843,576 | McClure et al. | Feb. 2, 1932 |
| 2,424,853 | Safford | July 29, 1947 |
| 2,428,252 | Stroh | Sept. 30, 1947 |
| 2,510,661 | Safford | June 6, 1950 |
| 2,528,606 | Pedersen | Nov. 7, 1950 |
| 2,563,555 | Safford | Aug. 7, 1951 |
| 2,578,605 | Sears et al. | Dec. 11, 1951 |
| 2,610,167 | Te Grotenhuis | Sept. 9, 1952 |
| 2,665,264 | Brooks et al. | Jan. 5, 1954 |

OTHER REFERENCES

Gage: Rubber Age, December 1945, pages 343–346.

Gage et al.: India Rubber World, March 1950, pages 669–673 and 677.